United States Patent [19]

Gomez

[11] Patent Number: 4,574,136

[45] Date of Patent: Mar. 4, 1986

[54] PLASTICIZED POLYVINYL BUTYRAL INTERLAYERS

[75] Inventor: I. Luis Gomez, Longmeadow, Mass.

[73] Assignee: Monsanto Company, St. Louis, Mo.

[21] Appl. No.: 523,305

[22] Filed: Aug. 15, 1983

[51] Int. Cl.$^4$ .................. C08L 91/00; C08K 5/10
[52] U.S. Cl. .................. 524/310; 524/311; 264/176 R; 428/412; 428/437; 428/483; 428/497; 428/913; 252/182
[58] Field of Search .................. 428/412, 437, 483; 524/310, 311

[56] References Cited

U.S. PATENT DOCUMENTS 3,402,139  9/1968  Mont et al. .................. 428/437

Primary Examiner—P. C. Ives
Attorney, Agent, or Firm—M. J. Murphy; W. J. Farrington; P. D. Matukaitus

[57] ABSTRACT

In a polyvinyl butyral (PVB) sheet plasticized with a multiester of an alcohol having 2 to 4 hydroxyl groups and a $C_{16}$ to $C_{20}$ unsaturated fatty acid having a hydroxyl group attached to the acid molecule, which sheet does not craze polycarbonate or polyacrylate when in contact therewith, the addition of a synergistically effective amount of a monoester of a glycol and such $C_{16}$ to $C_{20}$ acid improves the low temperature penetration resistance and adhesion properties of such sheet without significant loss in its resistance to stress cracking polycarbonate or polyacrylate in a laminated glass assembly.

5 Claims, No Drawings

PLASTICIZED POLYVINYL BUTYRAL INTERLAYERS

BACKGROUND OF THE INVENTION

This invention relates to polyvinyl butyral (PVB) sheet plasticized with fatty acid esters and more particularly with a fatty acid ester blend which provides the sheet with improved penetration resistance without significant loss in its resistance to stress cracking polycarbonate or polyacrylate when in contact therewith as an interlayer in a laminated glass assembly.

In recent years sociologists and psychologists have started a movement toward prisons without bars. Thick layers of impact resistant polycarbonate initially used in such applications were quite early determined to be inadequate since the polycarbonate could be burned or scratched or dissolved or fractured when heated or abused. Moreover, when exposed to the elements the polycarbonate turned yellow, lost its strength and was susceptable to crazing. Based on this early work a need was defined for a material for security applications which was strong, chemically impervious, and scratch and fracture resistant over a wide range of ambient conditions.

Thereafter laminates of one or more layers of glass with one or more layers of polycarbonate were proposed which in use were mounted with the glass layer on the outside exposed to the elements and the polycarbonate either forming the innermost surface or positioned inboard of a glass layer forming such innermost surface. However, with these laminates an interlayer between the glass and polycarbonate is necessary since polycarbonate will not adequately adhere to glass.

Thermoplastic polyurethane layers have been used to laminate polycarbonate to glass but polyurethanes are costly and usually require treatment of the glass with a primer coating before lamination. Moreover, such polyurethanes are difficult to process into laminates because their low melting temperatures dictate the need for a batch type deairing operation with long exposure to vacuum for complete air removal. Commercially available grades of PVB sheet are not acceptable as an interlayer to adhere polycarbonate to glass because the plasticizer in the PVB crazes the polycarbonate. To solve this a special barrier coating, as disclosed in U.S. Pat. No. 4,243,719, was proposed between the polycarbonate and PVB to keep the plasticizer in the PVB away from the polycarbonate. The PVB is still necessary since the coating will not adhere to the glass and the PVB assists in absorbing energy on impacting. Such a coating must be pinhole-free for obvious reasons and moreover is costly in that it represents an additional layer in an already multilayered laminate which could be avoided if a plasticizer for PVB were available which did not craze the polycarbonate.

Sulfonamide and phosphate plasticizers for PVB which do not attack polycarbonate are disclosed in U.S. Pat. Nos. 3,539,442 and 3,406,086 respectively but PVB containing such plasticizers can only be difficultly extruded in forming sheet since they tend to decompose at extrusion conditions and degrade the PVB.

Certain esters which in natural form can be the major constituents of castor oil are proposed in U.S. Pat. No. 4,128,694 as plasticizers for PVB which neither craze polycarbonate or polyacrylate nor deteriorate during extrusion of plasticized PVB. However, such interlayers exhibit relatively high glass transition temperatures (Tg) at the usual plasticizer loadings and marginal peel adhesion to polycarbonate which means the impact properties at low performance temperatures are also marginal. This has precluded the use of such interlayers in security glass applications exposed to cold climates.

A need, therefore, exists in the art for a plasticized PVB sheet having the properties of those disclosed in U.S. Pat. No. 4,128,694, but which has a low Tg and higher peel adhesion and therefore improved low temperature performance properties when present as a functional PVB interlayer in a security glass laminate. Higher peel adhesion (i.e. equal to or greater than 10 newtons per cm) is needed to maintain laminate integrity during and after laminate impacting. However, very high peel adhesion (i.e. equal to greater than 30 newtons per cm) can produce laminate failure due to breakthrough when the laminate is impacted. On the other hand, very low peel adhesion (i.e. less than 10 newtons per cm) can produce delamination on impacting, e.g. along the laminate edges.

SUMMARY OF THE INVENTION

Now improvements have been developed which overcome the aforementioned deficiencies of the prior art.

Accordingly, it is a principal object of this invention to provide a plasticized PVB interlayer which is usable with polycarbonate and has improved performance properties over a wide range of temperatures in a security glass laminate.

Another object of this invention is to provide a laminate of plasticized PVB in adherent contact with polycarbonate or polyacrylate which has improved peel adhesion and high penetration resistance at low temperatures.

A further object is to provide such a PVB interlayer which can be laminated on existing commercial laminating lines without altering laminating conditions.

An additional object is to provide an improvement in the process for preparing PVB sheet which incorporates a plasticizer component responsible for improving the peel adhesion and penetration resistance at low temperatures of a laminate containing such plasticized PVB in contact with polycarbonate or polyacrylate.

Other objects of this invention will in part be obvious and will in part appear from the following description and claims.

These and other objects are accomplished in a PVB sheet plasticized with a multiester of an alcohol having 2 to 4 hydroxyl groups and a $C_{16}$ to $C_{20}$ unsaturated fatty acid having a hydroxyl group attached to the acid molecule by providing the improvement which comprises, in property-improving combination with such multiester, a synergistically effective amount of a monoester of a glycol and such $C_{16}$ to $C_{20}$ unsaturated fatty acid. The monoester is preferably propylene 1,2 glycol partially esterified with ricinoleic acid.

DESCRIPTION OF PREFERRED EMBODIMENTS

U.S. Pat. No. 4,128,694 discloses a plasticizer for PVB resin in the form of a specific fatty acid multiester of an alcohol having 2 to 4 hydroxyl groups and a $C_{16}$ to $C_{20}$ unsaturated fatty acid having a hydroxyl group attached to the acid molecule. The term "multiester" as used herein means an ester formed by esterifying more than one hydroxyl group of such an alcohol with such an acid. Such plasticizer in a PVB interlayer does not attack polycarbonate or polyacrylate when present in a multiple panel safety or security glass laminate assembly. In the present invention, a monoester species of such specific fatty acid multiester is combined with the latter to form a plasticizer blend for PVB which unexpectedly lowers the Tg of PVB plasticized therewith and incrementally improves the PVB interlayer penetration resistance and peel adhesion to polycarbonate over that obtained using the fatty acid multiester alone. Performance with polyacrylate is predicted to be similar. The plasticizer blend of the present invention, therefore, comprises a multiester component (e.g. a triester) combined with a monoester glycol component, each component being derivable from the same class of unsaturated fatty acids.

The preferred multiester component of the plasticizer blend of the present invention is contained in castor oil which is a triglyceride ester of fatty acids. It comprises a mixture of esters of glycerol with the following acids, (the figure in parentheses being the approximate weight percent of esters formed from that acid): ricinoleic acid (89.5%), oleic acid (3.0%), linoleic acid (4.2%), stearic acid 1% and dihydroxy-stearic acid. Approximately 63.6% of the ricinoleate is triester, (glycerol triricinoleate) 31.1% diester and 5.1% the monoester. The latter level of monoester in castor oil is insufficient in itself to provide the improvement of the present invention. Other multiesters found useful wherein one molecule of the esterifying acid has reacted with each available hydroxyl of the alcohol are those based on triethylene glycol, trimethylol propane and pentaerythritol.

The unsaturated fatty acid monoester found synergistically effective as an additional plasticizer in combination with the preferred castor oil in PVB sheet in property improving combination in a blend with the multiester referred to above is a monoester of a glycol and a $C_{16}$ to $C_{20}$ unsaturated fatty acid having a hydroxyl group attached to the acid molecule. The preferred monoester is propylene glycol 1,2 monoricinoleate. Though not certain of the reason, it appears that the unreacted hydroxyl group immediately adjacent the acid linkage in the monoester plays an important function in the plasticizer blend insofar as improving the peel adhesion to polycarbonate or polyacrylate of PVB interlayer plasticized therewith, as well as the penetration resistance of glass laminates made up of layers of these materials.

The acids that may be used to form the multiester and monoester plasticizer components of the blend of the present invention have from 16 to 20 carbon atoms and include in addition to ricinoleic acid, (12-hydroxyoleic acid) other hydroxy-oleic acids with the hydroxyl group located other than on the "12" carbon atom such as 6-, 8-, 14-, or 16-hydroxy-oleic acid, 12-hydroxyelaidic acid and acids with the same empirical formula with the hydroxyl located on other than the "12" atom. Also included are the corresponding variations of 12-hydroxy-hexodec-9-enoic acid and 12-hydroxy-eicos-9-enoic acid.

A single acid may provide all the esterifying acid groups but usually a mixture of unsaturated esterifying acids, are used, provided that the esterifying acids together provide at least one unsaturation and one hydroxyl group per molecule of plasticizer.

The amount of plasticizer blend to be used in the laminate interlayer of the invention should be from 10 to 55 parts per hundred parts of PVB resin (phr). The preferred amount is 20 to 50 phr and particularly preferred is 30 to 40 phr.

The weight proportion of monoester to multiester in the plasticizer blend should be between about 1:1 to about 5:1. When castor oil is used as the multiester, allowance may optionally be made for the minor level of monoester therein in determining the total amount of monoester to be used in the blend. It is preferred that the monoester be present as the major constituent of the plasticizer blend, i.e. present in amount greater than the multiester. The most preferred proportion of monoester to multiester is 2:1.

The monoesters of the present invention are commercially available from CasChem Inc., Bayonne, N.J., 07002 under the registered trademark Flexricin. The various grades of each used in the Examples following are identified in the footnotes to Table 1.

In general, the polyvinyl acetal resins employed may be considered to be made up, on a weight basis, of from 5 to 25 percent hydroxyl groups, calculated as polyvinyl alcohol, 0 to 4 percent acetate groups, calculated as polyvinyl acetate, and the balance substantially acetal. When the acetal is butyraldehyde acetal, the polyvinyl acetal resin will preferably contain, on a weight basis, from 10 to 25 percent hydroxyl groups, calculated as polyvinyl alcohol and from 0 to 10 percent acetate groups, calculated as polyvinyl acetate, the balance being substantially butyraldehyde acetal.

The polycarbonate component may be any suitable sheet of polycarbonate such as disclosed in U.S. Pat. Nos. 3,028,365 and 3,117,019 and is preferably prepared by reacting di(monohydroxyaryl)-alkanes with derivatives of carbonic acid such as phosgene and bischlorocarbonic acid esters of di-(monohydroxy-aryl)-alkanes. Commercial polycarbonate sheeting is available from General Electric Company under the trademark Lexan.

Where the resin sheet is a polyacrylate this may be as an ester of a lower aliphatic alcohol, such as butyl-, propyl-, ethyl-, or methyl alcohol and acrylic-, methacrylic-, ethacrylic, propacrylic- or butacrylic- acid. By far the most convenient is polymethyl methacrylate.

The plasticized interlayer of the invention can be used to make a simple laminate with the interlayer in contact on at least one surface with a polycarbonate or a polyacrylate sheet. Usually one of the surfaces of the interlayer will be in contact with a different material such as glass.

For security glass it is usual to provide multiple layers, such as four or more, comprising plasticized interlayers and polycarbonate or polyacrylate layers and glass layers laminated together to form laminates of from ½ inch up to several inches in thickness. For such purposes the construction usually comprises glass/interlayer/polycarbonate or polyacrylate/interlayer/glass units multipled as appropriate.

The laminates produced using the plasticized interlayer of the invention may be treated to reduce light transmission by tinting one or more the component layers or by supplying a metallized surface to one or more of the layers. The treatment can be such as to produce a uniform reduction in light transmission over the whole sheet or perhaps in the form of a band or other form of localized effect.

Laminates formed according to the present invention are broadly useful in any application requiring a safety glass assembly such as in vehicular windshields, but are especially useful in security applications such as prisons without bars and installations requiring a somewhat lesser degree of security such as bank windows, cashier booths, jewelry counters and the like. Applications in which the laminates of the invention can be used are disclosed in U.S. Pat. No. 4,243,719, col. 10, line 3 through col. 12, line 36, the content of which is incorporated herein by reference.

In addition to the plasticizers, the interlayers of the present invention may contain other additives such as dyes, ultraviolet light stabilizers, salts to control adhesion and antioxidants and may, if desired, be treated with additives to improve laminating efficiency.

The invention is further described with reference to the following examples which are for illustration only and are not intended to imply any limitation or restriction on the invention.

EXAMPLES 1-9

Laminates of uncoated, general purpose high impact, glazing grade, polycarbonate (Lexan 9030) and PVB sheet were made using various plasticizers according to the following procedure.

The PVB used contained 18 weight percent hydroxyl groups (measured as polyvinyl alcohol) and had a solution viscosity of 230–250 cps as determined by Kinemetic Viscometer, Cannon Fenske type (ASTM D-4445). The plasticizer(s) was added to the PVB resin and mixed either manually or with a low intensity laboratory mixer and allowed to sit overnight to promote absorption of the plasticizer by the resin. A sigma blade mixer with steam for heating passing through the mixer jacket was then used for about ten minutes to melt and mix the resin and plasticizer and form molten crumbs of plasticized PVB.

The crumbs of plasticized PVB were deposited in a frame and pressed into blocks 35.5 cm by 40.6 cm of about 5 cm thickness. Slices of plasticized interlayer of about 0.75 mm thickness were cut from these blocks and separated from each other via interposed plastic film, conditioned for about one hour at 20 to 35% relative humidity to control moisture level therein at 0.4 to 0.5 weight %.

Initially washed polycarbonate (0.32 cm to 0.62 cm thickness) sheets and layers of commercially available float glass were used in assembling each laminate as follows: a slice of plasticized interlayer was placed on either side of the polycarbonate layer and then a layer of glass placed against each layer of interlayer. The loosely assembled laminate was pre-compressed at about 46.7 kg/cm$^2$ at temperatures of 100° C.–215° C. in conventional manner using a heated press, then air-autoclaved at 93° C., 3.5 kg/cm$^2$ for one hour, 10 min., followed by 135° C. and 13 kg/cm$^2$ for one hour after which the temperature was reduced to 38° C. for 20 min. whereupon the pressure was reduced to end the cycle.

Other laminates for peel adhesion testing were prepared using standard laminating techniques familiar to those in the art except that an adhesive coated aluminum foil was substituted for one of the glass layers and the glass and interlayer on the other side of the polycarbonate was eliminated.

Values for the various properties presented in Table 1 following were determined according to the following procedures.

The glass transition temperature (Tg) of plasticized PVB was measured using a Rheometric Mechanical Spectrometer which is a rectangular torsion test conducted in a nitrogen atmosphere at a constant frequency (1-hertz) and temperature.

Compatability of plasticizer and PVB resin as determined by the extent of exudation of the plasticizer from the resin after melt mixing was visually noted by the absence or presence and level of free plasticizer either on the surface of the plasticized resin or in the bowl of the sigma mixer.

Penetration resistance of the glass-poly-carbonate-plasticized interlayer laminates was measured by dropping a 2270 gm steel ball five times from 2.4 m onto the laminate which had been pre-conditioned for two hours at the temperature at which the test was run. The integrity of the sample insofar as the extent, if any, of delamination along the glass cracks between the polycarbonate and interlayer was visually noted after five drops. The term "good integrity" as used in Table 1 following means that some portion of the laminate, such as the edge area, had all components adhered together after testing.

Clarity of the autoclaved laminate as determined by haze level was visually noted.

Stress cracking of the polycarbonate by the plasticizer(s) used in the interlayer was determined at 23° C. and 70° C. In this test the stress applied to polycarbonate specimens was incrementally increased to 2000 psi while a patch saturated with the plasticizer fluid was applied at the point of maximum stress and the stress noted at which cracking occurred. More specifically, injection molded polycarbonate coupons in the form of beams about 2.54 cm wide were loaded for a specified time, e.g. 10 minutes, and then the patch saturated with the test plasticizer was applied to the point of maximum stress for an additional time depending on the temperature-i.e. 72 hours at 23° C. and 8 hours at 70° C.

Peel adhesion-two parallel grooves 4 cm apart were formed lengthwise through the aluminum foil and interlayer. The polycarbonate at one end of the laminate a few cms in from the end was scored and broken perpendicular to the grooves. The outside edge of the aluminum foil and interlayer on each side of the 4 cm strip was cut at the polycarbonate break. The foil, interlayer and cut polycarbonate were then clamped in the test grips of an Instron tensile tester and the force required to separate the foil and interlayer from the polycarbonate along the grooves measured at room temperature. A range of 10 to 30 newtons/cm is desired to provide the optimum balance of impact and delamination resistance in the laminate.

The results obtained are set forth in the following Table 1.

TABLE 1

| | | Plasticizer | | | | | Peel Adhesion Newtons/cm |
|---|---|---|---|---|---|---|---|
| | | Amount (phr) | Ratio monoester/ polyester | Penetration resistance | | | |
| Example | Plasticizer | | | −10° C. | 0° C. | 23° C. | |
| 1 | Glycerol tri-ricinoleate[1,5] | 47.5 | — | complete delamination | complete delamination | significant delamination in impact | 8-9 |

TABLE 1-continued

| | | | | | | | area | |
|---|---|---|---|---|---|---|---|---|
| 2 | Glycerol tri-ricinoleate (GT) and propylene glycol monoricinoleate (PGM)[2,5] | 12.75 30 | 2.4:1 | some delamination-good laminate integrity | some delamination-good laminate integrity | | no delamination-good laminate integrity | 15–22[3] |
| 3 | Propylene glycol monoricinoleate (PGM) | 42 | — | significant delamination in impact area-good laminate integrity | — | | — | 12 |
| 4 | Pentaerythritol Monoricinoleate[4] | 45 | — | — | — | | — | 12.8 |
| 5 | Glycerol triricinoleate/pentaerythritol monoricinoleate | 15 30 | 2.0:1 | — | — | | — | — |
| 6 | Ethylene glycol monoricinoleate[6] | 45 | — | significant delamination in impact area; good laminate integrity | — | | — | 13.6 |
| 7 | Glycol triricinoleate/ethylene glycol monoricinoleate | 15 30 | 2.0:1 | some delamination in impact area; good laminate integrity | — | | — | 10.5 |
| 8 | Glycerol monoricinoleate | 42.5 | — | — | — | | — | 13.0 |
| 9 | Glycerol tri-ricinoleate/glycerol monoricinoleate | 12.5 30.0 | 2.4:1 | complete[7] delamination | — | | — | 13.2 |

| Example | Tg (°C.) | Compatibility | Clarity | Stress Cracking (psi) 23° C. | 70° C. |
|---|---|---|---|---|---|
| 1 | 36–38 | fair | good | None at 2000 | None at 2000 |
| 2 | 17.5 | good | good | None at 2000 | 1700 |
| 3 | 18 | good | good | None at 2000 | 1000 |
| 4 | 30 | fair | fair | None at 2000 | None at 2000 |
| 5 | >30° C. (Estimated) | fair | poor-reddish tinge | — | — |
| 6 | 19 | good | good | None at 2000 | 1000 |
| 7 | 23 | good | good | — | — |
| 8 | 26 | poor-(over lubricated) | fair-reddish tinge | None at 2000 | 1500 |
| 9 | 26 | poor-(over lubricated) | fair | — | — |

[1] AA-Standard Grade Castor Oil from Spencer Kellogg
[2] PGM ws Flexricin 9
[3] Value of 22 obtained with cosmetic (pure) grade of Flexricin 9
[4] Flexricin 17
[5] Laminates were 0.6 m by 0.6 m
[6] Flexricin 15
[7] Laminates were 10 cm by 15 cm Stress crack performance of the glycerol triricinoleate/ethylene glycol monoricinolate blend of Example 7 is predicted to be equivalent to that obtained with the blend of Example 2 containing propylene glycol monoricinoleate.

The foregoing data indicates that when the multiester is the sole or principal plasticizer in the plasticized interlayer (Example 1) in accordance with U.S. Pat. No. 4,128,694, though stress crack resistance of the polycarbonate is good, the tendency to delaminate is high and therefore the penetration resistance is poor because of the relatively high value of Tg and low peel adhesion. When the lower molecular weight glycol monoester (Examples 3 and 6) was used alone, Tg was reduced and pentration resistance was improved, but at the expense of stress crack resistance of the polycarbonate at high temperature. However, when only a relatively minor amount (12.5–15 parts) of the multiester was added to the monoester, (Examples 2, and 7) acceptable stress crack resistance was obtained and peel adhesion was significantly increased with respect to the propylene glycol monoricinoleate species of Example 2 without a reduction in Tg and in penetration resistance. This significant increase in peel adhesion and failure of Tg to increase with the addition of the multiester constituent to the monoester constituent was unexpected. The blend containing a monoester of an alcohol having more than two hydroxyl groups, i.e. the pentaerythritol monoricinoleate species of Example 5 and the glycerol monoricinoleate species of Example 9, which are outside the scope of this invention, were deficient in color (Example 5) and compatibility (Example 9).

Though the plasticized PVB sheet of the invention can be formed by slicing from blocks as disclosed in the foregoing Examples, it is preferably formed by extrusion mixing and sheet formation of the interlayer in a slot die.

The monoester glycol component of the plasticizer blend of the invention may comprise blends of monoesters, such as a blend of individual ethylene and propylene glycol monoester constituents.

While certain specific embodiments of the invention have been described with particularity herein, it will be recognized that various modifications thereof will occur to those skilled in the art. The scope of the invention, therefore, is to be limited solely by the scope of the following claims.

I claim:

1. In a polyvinyl butyral sheet plasticized with a multiester of an alcohol having 2 to 4 hydroxyl groups and a $C_{16}$ to $C_{20}$ unsaturated fatty acid having a hydroxyl group attached to the acid molecule, the improvement which comprises, in property-improving combination with such multiester, a synergistically effective amount of a monoester of a glycol and said $C_{16}$ to $C_{20}$ unsaturated fatty acid, wherein the ratio of said monoester to said multiester is between about 1:1 to about 5:1.

2. The plasticized sheet of claim 1 wherein the monoester is propylene glycol-1,2 monoricinoleate.

3. The plasticized sheet of claim 1 wherein the monoester is ethylene glycol monoricinoleate.

4. The plasticized sheet of claim 1 wherein said ratio is about 2:1.

5. The plasticized sheet of claim 4 wherein the multiester is present as a castor oil component.

* * * * *